G. CHRISTENSON.
PISTON PACKING EXPANDER.
APPLICATION FILED AUG. 21, 1916.
1,222,361.
Patented Apr. 10, 1917.
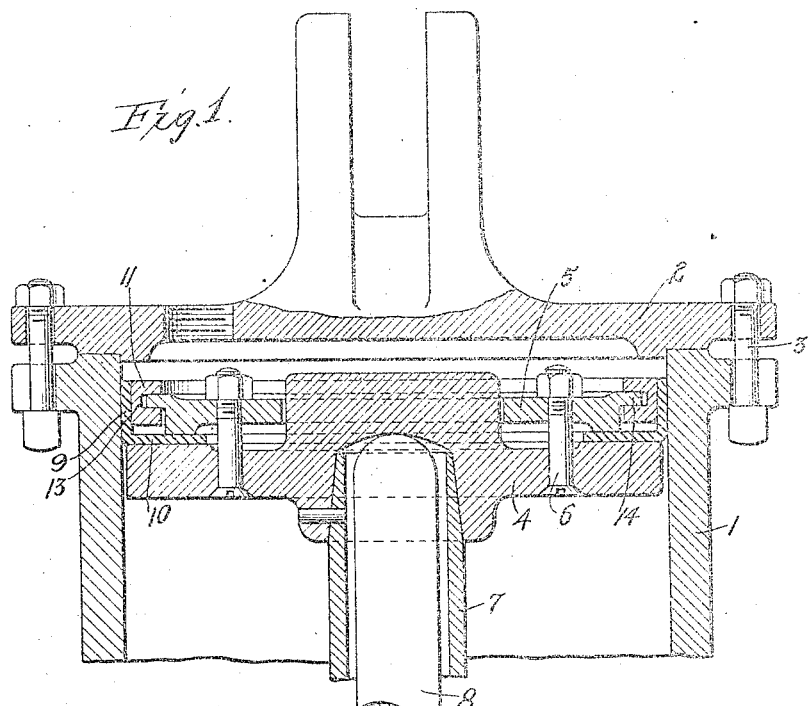
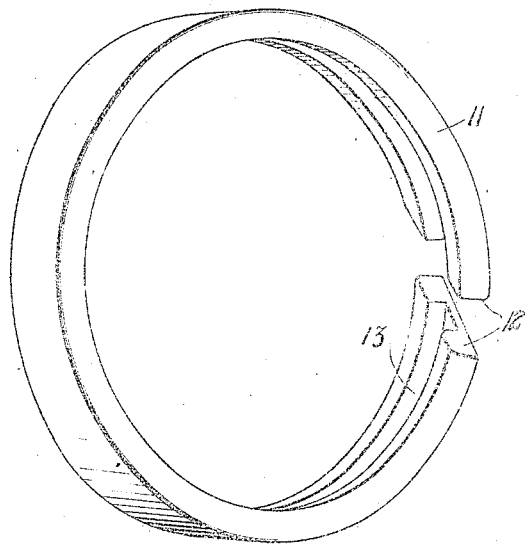
Inventor
George Christenson
By his Attorney

UNITED STATES PATENT OFFICE.

GEORGE CHRISTENSON, OF JAMAICA, NEW YORK, ASSIGNOR TO H. W. JOHNS-MANVILLE COMPANY, A CORPORATION OF NEW YORK.

PISTON-PACKING EXPANDER.

1,222,361.

Specification of Letters Patent. Patented Apr. 10, 1917.

Application filed August 21, 1916. Serial No. 116,094.

*To all whom it may concern:*

Be it known that I, GEORGE CHRISTENSON, a citizen of the United States of America, residing at Jamaica, county of Queens, State of New York, have invented certain new and useful Improvements in Piston-Packing Expanders, of which the following is a specification.

My invention relates to devices for expanding flexible packing for pistons such as are used in air brake cylinders, and comprises certain improvements on, or modifications of, the structure shown in my U. S. Patent No. 862,540, dated August 6, 1907. The best form of apparatus embodying my present invention now known to me is illustrated in the accompanying sheet of drawings in which—

Figure 1 is an axial section of an air brake cylinder and piston with my invention applied thereto, parts being broken away and Fig. 2 is a perspective view of the grooved spring split-ring expander.

Throughout the drawings like reference characters indicate like parts. 1, is a portion of the ordinary air brake cylinder having the head 2, fastened to it by bolts 3. 4, is a piston head; 5, the piston follower, and 6, one of the bolts which fasten the head and follower together to form the usual piston structure. 7, is the usual form of hollow piston rod used in freight brake equipment, set in the piston head 4, and 8, the usual push rod. The usual form of cup leather packing is shown in Fig. 1, formed of a strip of leather or other flexible material having the cylindrical outer portion 9, and the inwardly bent ring-shaped inner edge portion 10.

The foregoing parts are of usual construction except that the piston follower 5, is cut away more than usual so as to leave a circumferential tongue 14, projecting therefrom. 11, is a spring split-ring having a groove 13, on its inner surface which fits over the tongue 14, on the piston follower 5. In Fig. 2 the spring is shown in its normal position when not under tension with its ends 12, 12, slightly separated. Of course when the ring is sprung into position, as shown in Fig. 1, these ends more nearly abut and the elastic reaction of the spring holds the cylindrical part 9, of the cup leather firmly against the walls of the cylinder. At the same time, the circumferential tongue 14, on the piston follower fitting somewhat loosely in the groove 13, of the packing ring 11, serves as a guide and retainer for said packing ring during all movements of the assembled parts.

The advantages of my invention over prior forms of piston packing expander comprise the broad area of outward pressure exerted on the inner surface of the packing leather resulting from the wide face of ring 11, the low cost of manufacture resulting from the fact that two ribs on either side of groove 13 give sufficient elasticity to a ring formed of low grade cast steel alone, and the location of the pressure surface solely against the cylindrical portion 9, of the cup leather and up to the extreme edge thereof. These features of operation of my present invention avoid the tendency of packing leathers to curl back at the edge, and to wear through at the junction of portions 9 and 10, as the result of the pressure of the expander being localized at that point in most previous structures.

Having described my invention, I claim:

1. The combination with the usual piston structure and band of flexible packing thereon, of a spring split-ring expander arranged within said packing provided with an interior circumferential groove, and a circumferential projection on the piston structure fitting into said groove and adapted to serve as a guide and retainer for the spring ring.

2. The combination with the usual piston head, piston follower, and cup leather packing having its inner edge clamped between the two, of a spring split-ring within the cylindrical portion of the packing, said ring having a circumferential groove in its interior surface, and said piston follower having a circumferential tongue fitting into said groove.

GEORGE CHRISTENSON.